(12) United States Patent
Hoffmeier

(10) Patent No.: US 7,945,984 B2
(45) Date of Patent: May 24, 2011

(54) CLEANING ROTOR

(75) Inventor: Dieter Hoffmeier, Ibbenbüren (DE)

(73) Assignee: OASE GmbH, Horstel (DE)

( * ) Notice: Subject to any disclaimer, the term of this patent is extended or adjusted under 35 U.S.C. 154(b) by 976 days.

(21) Appl. No.: 11/578,569

(22) PCT Filed: Apr. 13, 2005

(86) PCT No.: PCT/DE2005/000695
§ 371 (c)(1),
(2), (4) Date: Jun. 25, 2007

(87) PCT Pub. No.: WO2005/100255
PCT Pub. Date: Oct. 27, 2005

(65) Prior Publication Data
US 2007/0245507 A1    Oct. 25, 2007

(30) Foreign Application Priority Data
Apr. 16, 2004   (DE) .................. 10 2004 019 619

(51) Int. Cl.
*B08B 1/04*     (2006.01)
*F28G 3/00*     (2006.01)
(52) U.S. Cl. .................. 15/246; 15/141.2
(58) Field of Classification Search .......... 15/104.04, 15/93.1, 246; *A61N 5/06*
See application file for complete search history.

(56) References Cited

U.S. PATENT DOCUMENTS 3,061,721 A * 10/1962 Al Brenner ............ 250/431
4,650,012 A *  3/1987 Bollinger et al. ........ 175/84
7,217,938 B2 *  5/2007 Hoffmeier ............ 250/504 R FOREIGN PATENT DOCUMENTS
DE    12 83 862 B    11/1968
DE    102 05 655 A1   8/2003

OTHER PUBLICATIONS

Ozuru Makoto, et al., "Photochemical Reactor", Patent Abstracts of Japan, JP 2000-89953 A, Jul. 11, 2000.
Uemori Yasuji, "Sterilizing Lamp Protecting Pipe Cleaning Apparatus for Water Treatment", Patent Abstracts of Japan, JP 08-276179 A, Oct. 22, 1996.

* cited by examiner

*Primary Examiner* — Monica S Carter
*Assistant Examiner* — Stephanie Newton
(74) *Attorney, Agent, or Firm* — Dowell & Dowell, PC

(57) ABSTRACT

The invention relates to a cleaning rotor (1) having a longitudinal axis (L), a base part (5), which extends concentric to the longitudinal axis (L), a head part (3) and a strut element (9) that extends between the base part and the head part. Said strut element (9) extends in a helical manner about the longitudinal axis (L). The invention is characterized in that at least one supporting part (7) is placed between the base part (3) and the head part (3) while extending parallel to the longitudinal axis (L). The strut element (9) is supported on the supporting part (7) and is concave over its length.

11 Claims, 1 Drawing Sheet

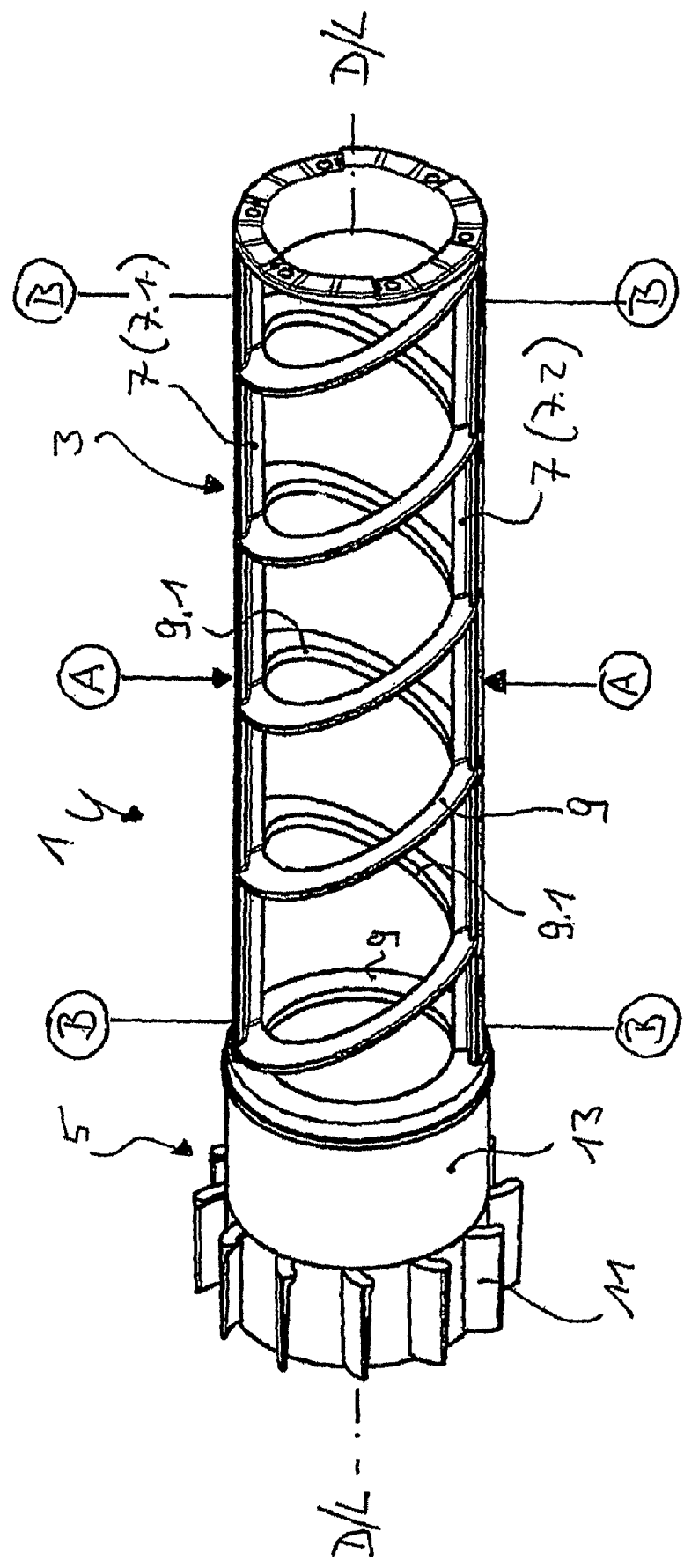

CLEANING ROTOR

BACKGROUND OF THE INVENTION

1. Field of the Invention

The present invention relates to a cleaning rotor having a longitudinal axis, a base part extending concentric to the longitudinal axis, a head part and a strut element extending between the base part and the head part, said strut element extending about the longitudinal axis in a helical manner.

2. Brief Description of the Related Art

A cleaning rotor of this type is known, for example, from DE 101 47 019 A1. The disadvantage of the aforementioned cleaning rotors which are used to clean UV lamps in filtering devices is that, for several reasons, they do not have a good cleaning action. Either the strut element or cleaning element is too loose, so that even several movements in a helical manner about the UV lamp to be cleaned do not pass close enough and thus reliably about each position of the outer surface of the lamp. An arrangement of this type can e.g. be obtained by stiffer strut elements or cleaning elements which only have half a pitch for this but in a double form, for example, are arranged diametrically opposite one another and thus double the low cleaning action by half a pitch. However, forming several strut or cleaning elements in a single cleaning rotor does not lead to the optimum cleaning. The stiffness can also not be sufficiently increased with a half pitch. The cleaning efficiency depends very much on a repeated sweeping of a surface to be cleaned with a strut or cleaning element and a reliable contact with the entire surface of a UV lamp or another smooth (glass) bulb.

SUMMARY OF THE INVENTION

Therefore, the object of the present invention is to create a cleaning rotor which reliably cleans off a surface to be cleaned by repeated sweeping with the strut or cleaning element.

According to the invention, the object is solved in that at least one supporting part is arranged between the base part and the head part parallel to the longitudinal axis on which the strut element is supported.

The one supporting part which extends parallel to the longitudinal axis and actuates a strut or cleaning element which extends helically about the longitudinal axis in a supporting manner, that also retains such a stiffness that a strut or cleaning element extending repeatedly about the longitudinal axis in direction of the longitudinal axis that each position of a surface to be cleaned is reliably reached.

A further advantage is that a blade wheel is also attached to the base part. With the blade wheel, the cleaning rotor according to the invention cannot only be made to rotate via the direct oncoming flow against the strut or cleaning element but also made to rotate by an oncoming flow against the blade wheel. Further advantages can be found in the features of sub claims 3 to 9.

BRIEF DESCRIPTION OF DRAWINGS

An embodiment of the present invention will be described in greater detail in the following with reference to the only FIGURE.

The FIGURE shows a schematic, perspective view of a cleaning rotor according to the invention.

DESCRIPTION OF THE PREFERRED EMBODIMENT

A cleaning rotor 1 is schematically and perspectively shown in the FIGURE. The cleaning rotor 1 has a longitudinal axis. The cleaning rotor 1 comprises a head part 3 and a base part 5 which are connected to one another by one or more supporting parts 7. A strut element 9, which is supported on at least one supporting part 7, extends helically between the base part 5 and the head part 3.

In the present embodiment, the head part 3 and base part 5 are annular and concentric to the longitudinal axis L. In addition, in the embodiment shown, two supporting parts 7.1 and 7.2 are arranged parallel to the longitudinal axis L and parallel to one another. Moreover, the two supporting parts 7.1 and 7.2 are arranged diametrically opposite on the head part 3 and on the base part 5, whereby this does not have to be the case in other embodiments. The strut element 9 is supported on each supporting part 7.1, 7.2. In the present embodiment, the strut element 9 is supported alternately on the first supporting part 7.1 and on the second supporting part 7.2 after a half pitch.

In other embodiments, only one supporting part 7.1 or 7.2 or several supporting parts 7, e.g. three or four supporting parts, can be provided. In all cases, the distance between the supporting parts 7 on the periphery of the head part 3 or base part 7 can be freely selected. Even when a uniform or, if possible, symmetrical arrangement of the supporting parts 7 is regularly useful, other irregular or asymmetrical arrangements can be useful in special cases when the stress of the at least one supporting strut element 9 is uneven in peripheral direction. The number and arrangement of the supporting parts 7 is dependent on the forces to be expected which act on the strut element 9 during the cleaning. The distance between the head part 3 and the base part 5, i.e. the length of the supporting parts 7.1 or 7.2, can also be freely selected, as required.

The strut element 9 extending between the head part 3 and the base part 5 in a helical manner should define at least two pitches. In the present embodiment, the strut element 9 defines e.g. 4.5 pitches. The number of defined pitches is dependent on the length of the supporting part 7.1 or 7.2.

Every supporting part 7.1, 7.2 is concave over its length, i.e. it is curved inward. In the area of the inner curvature, about at half length (position A), the inside diameter of the cleaning rotor 1 is about 1-2 mm larger than that of the cylindrical body to be cleaned; in the vicinity of the base part 5 (position B) and of the opposite free end (position B), the inside diameter of the cleaning rotor 1 is about 1.5 to 2.5 mm larger than at position A. As a result, when the cleaning rotor 1 rotates, so-called tumbling movements occur which lead thereto that the strut element 9 reaches every position on the cylinder surface, e.g. of a glass bulb, and then also cleans it. The strut element 9 seals flush on the inside with each supporting part 7.1, 7.2, so that an infinitely variable path of motion can result on the inside from the base part 5 to the head part 3. This path of motion on the strut element 9 is defined as a cleaning surface 9.1 of the strut element 9 in the following. This cleaning surface 9.1 can be provided with a material which facilitates a mechanical cleaning of a cylindrical body, e.g. fibers, fleece materials, etc. The cleaning surface 9.1 can also have or be provided with a chemical cleaning agent to promote a chemically assisted mechanical cleaning of a cylindrical body.

A blade wheel 11 adjoins the base part 5, the axis of rotation D of said blade wheel coinciding with the longitudinal axis L of the cleaning rotor 1 and with which only a slight torque can be exerted. In other embodiments, the axis of rotation D of the blade wheel 11 does not have to coincide with the longitudinal axis L of the cleaning rotor 1 but can, for example, extend at an angle of 90° to it. In a case of this type, at least one transfer element for transferring the rotary motion of the blade wheel 11 onto the base part 5 would be required.

In the present embodiment, the blade wheel 11 is securely connected with the base part 5. A tubular spacer 13 is found between the blade wheel 11 and the base part 5.

In other embodiments, the blade wheel 11 can be arranged on the base part 5 or on the spacer 13 so as to be detachable. In the present embodiment, the cleaning rotor 1 is made as one piece with the base part 5, the head part 3, the spacer element 13 and the blade wheel 11.

In practice, the cleaning rotor is placed loosely over a cylindrical body, e.g. a quartz glass bulb, which forms a protective cover for a UVC lamp in such a way that the cleaning surface 9.1 adjoins the inwardly curved position on the outer peripheral surface of the cylindrical body. The blade wheel 11 is then situated in the flow path of a fluid, for example a liquid or a gas, so that the flow of the corresponding fluid rotates the blade wheel 11 about the axis of rotation D. Due to the rotation about the axis of rotation D of the blade wheel 11, the spacer element 13 and the base part, head part 3 and the supporting elements 7.1 and 7.2, which are arranged between them, with the strut element 9 and the cleaning surface 9.1 also rotates about the longitudinal axis L. Due to the rotational movement of the cleaning surface 9.1 about the longitudinal axis L, the outer peripheral surface of the cylindrical body is cleaned off. The contaminations loosened by the cleaning surface 9.1 can be moved away by the aforementioned fluid.

The cleaning rotor 1 is loosely attached over the cylindrical body with 1 to 2 mm play, so that the cleaning rotor 1 does not jam due to sand, dirt or the like. Furthermore, the cleaning rotor 1 and the cylindrical body to be cleaned are supported in one another, so that no additional support is required for the rotor.

The cleaning rotor 1 is distinguished by an increased stability, so that surfaces of heavily contaminated cylindrical bodies can also be cleaned. The rigid connection between blade wheel 11 and base part 5 also leads to an optimal transmission of power and a reliable rotary movement in dependency on the flow velocity, so that the cleaning efficiency is also optimized as a result. In special embodiments, several strut elements 9 can also be arranged in such a way that a cleaning surface 9.1 passes along the surface of a cylinder to be cleaned in each case during a rotary movement about the longitudinal axis L.

The invention claimed is:

1. A cleaning rotor comprising: a longitudinal axis, a base part extending concentric to said longitudinal axis, a head part and a strut element extending between said base part and said head part, whereby said strut element extends about said longitudinal axis in a helical manner, and at least one supporting part between said base part and said head part is arranged parallel to said longitudinal axis on which said strut element is supported, wherein said at least one supporting part rotates about said longitudinal axis upon rotation of said base part, said head part and said strut element, and wherein said at least one supporting part is further defined as concave over its length.

2. The cleaning rotor according to claim 1, further comprising a blade wheel arranged on said base part, wherein the turning of said blade wheel rotates said strut element.

3. The cleaning rotor according to claim 2, wherein said blade wheel has an axis of rotation which coincides with said longitudinal axis.

4. The cleaning rotor according to claim 1, wherein said base part, said strut element and said at least one supporting part are made as one piece.

5. The cleaning rotor according to claim 2, wherein said base part, said strut element, said at least one supporting part and said blade wheel are made as one piece.

6. The cleaning rotor according to claim 1, wherein two of said at least one supporting part are provided.

7. The cleaning rotor according to claim 6, wherein said strut element defines at least two pitches between said base part and said head part.

8. The cleaning rotor according to claim 7, wherein said strut element has a half pitch between two of said at least one supporting part.

9. The cleaning rotor according to claim 8, wherein said head part is made as one piece with said strut element.

10. The cleaning rotor according to claim 5, wherein two of said at least one supporting part are provided.

11. The cleaning rotor according to claim 1, wherein said head part is made as one piece with said strut element.

* * * * *